United States Patent [19]

Müller-Werth

[11] 4,277,737
[45] Jul. 7, 1981

[54] METHOD OF AND MEANS FOR UTILIZING RECHARGEABLE BATTERIES IN THE OPERATION OF ELECTRIC VEHICLES

[76] Inventor: Bernd Müller-Werth, Hildegardstrasse 13, D-6670 St. Ingbert, Fed. Rep. of Germany

[21] Appl. No.: 940,162

[22] Filed: Sep. 7, 1978

[30] Foreign Application Priority Data

Sep. 8, 1977 [DE] Fed. Rep. of Germany ....... 2740438

[51] Int. Cl.³ .................. H02J 7/00; H01M 10/50; H02G 13/08
[52] U.S. Cl. ................. 320/2; 174/52 PE; 180/65 R; 429/120; 429/151
[58] Field of Search .................... 320/2-4, 320/6, 7, 15, 16, 35, 36, 61; 180/65 R; 290/16; 429/120, 151; 219/202; 361/388, 381; 174/52 PE, 52 S

[56] References Cited

U.S. PATENT DOCUMENTS

| | | | |
|---|---|---|---|
| 3,387,194 | 6/1968 | Banks | 320/7 X |
| 3,444,946 | 5/1969 | Waterbury | 320/6 UX |
| 3,461,954 | 8/1969 | Banks et al. | 429/120 X |
| 3,487,229 | 12/1969 | Krauscz | 320/7 X |
| 3,530,536 | 9/1970 | Aronson | 320/7 X |
| 3,736,489 | 5/1973 | Mullersman | 320/35 |
| 3,798,072 | 3/1974 | Anderson | 429/120 X |
| 3,845,835 | 11/1974 | Petit | 320/61 X |
| 3,874,472 | 4/1975 | Deane | 320/61 X |
| 3,904,947 | 9/1975 | Crews | 180/65 X |
| 3,971,454 | 7/1976 | Waterbury | 290/16 X |
| 4,139,812 | 2/1979 | Huggins | 320/7 |

Primary Examiner—Robert J. Hickey
Attorney, Agent, or Firm—Karl F. Ross

[57] ABSTRACT

The engine of an automotive vehicle is powered by an assembly of electric batteries which are recharged from time to time, on standstill or during driving, from various sources including a set of solar cells on the vehicle body, braking generators driven by the vehicle wheels on deceleration, and external power supplies. Both the batteries and the solar cells can be selectively connected in series and in parallel, the former particularly during recharging. The batteries are grouped in thermally insulated blocks of molded resin with channels, left from the injection-molding operation, accommodating ancillary equipment such as electronic switches mounted on cooling bars.

7 Claims, 7 Drawing Figures

METHOD OF AND MEANS FOR UTILIZING RECHARGEABLE BATTERIES IN THE OPERATION OF ELECTRIC VEHICLES

FIELD OF THE INVENTION

My present invention relates to a method of charging batteries with electrical energy and extracting energy from the batteries, especially in electric vehicles, as well as to a system for carrying out the method during driving and on standstill of such a vehicle.

BACKGROUND OF THE INVENTION

Electric vehicles have been long known in various constructions. In comparison with the vehicles operated by internal-combustion engines they have the advantage of being exceptionally smooth-running and, besides, environmentally harmless. A drawback, however, is found to reside in their very limited operating range preventing overland or long-distance driving. This small operating range is due in particular to the fact that the available energy accumulators would have to be much too large if one attempted to store therein the energy needed for long-distance driving. Since an increase in the size of the batteries also entails an enormous accretion of weight, it is understandable that automotive electric vehicles have come into their own virtually exclusively for operation over small areas.

OBJECTS OF THE INVENTION

The object of the present invention is to provide a method enabling the achievement of a large operating range with relatively small and light-weight batteries. It is also an object of the invention to provide a circuit arrangement and other means enabling the practical realization of conditions facilitating an economical operation of an electric vehicle with large operating range and small as well as rechargeable batteries. It is, moreover, desirable that these objects be achieved within an economically acceptable framework and the resulting system have a high operational capacity and be easy to handle. Not to be ignored is the requirement that the light-weight and small batteries, despite their large power, should have a long service life.

SUMMARY OF THE INVENTION

I attain these objects, by recharging one or more battery blocks, each consisting of several batteries, by any of several energy sources such as generators driven by braking energy, solar-cell arrays, or a power supply drawing rectified and stabilized current from a utility network. These and other sources may come into effect, preferably at staggered times, in dependence upon the existing operational conditions; on charging as well as upon the withdrawal of energy, the batteries—generally consisting of several individual cells—of the battery block or blocks concerned are connected in parallel or in series according to prevailing operating conditions. Whereas heretofore the batteries of an electric vehicle could be charged only from energy sources within the limited area of the operating range of the respective vehicle, at least a part of the charging facility is taken along by my present method, aside from the fact that energy is generated also during normal driving with the end result that with a given storage capacity the operating range is significantly increased. Since, furthermore, the weight is appreciably diminished, the payload of the vehicle rises in an advantageous manner. The decrease in the size of the batteries is also decisively facilitated by the fact that no constant charging occurs during driving but, rather, charging and discharging phases alternate without temporary interruption whereby the batteries are placed with their current delivery in the optimum power range so that a high efficiency is attained. This mode of operation with alternation in the optimum power range also insures a lengthening of the service life of the batteries. Of particular significance, however, is also the switchover to parallel and series operation since this not only enables the charging from different energy sources but also allows the selection of high-voltage drive motors which inherently offer special advantages as concerns their weight and the wiring.

A further feature of the invention provides that during the withdrawal of energy the batteries are connected in series. This results in the above-indicated relatively high operating voltage which may lie, for example, around 200 volts. This high voltage, not customary with vehicles, leads to the aforesaid reduction in the size of the drive motors requiring only weak and therefore light-weight and inexpensive conductors.

A further feature of my present invention resides in that upon charging during driving without energy consumption the batteries are connected in parallel and the braking energy, the solar-cell energy and the output current of a generator are utilized as energy sources according to their availability. Thus, there occurs the aforementioned constant alternation between charging and discharging of the batteries which promotes the absorption of current inasmuch as the batteries are kept, so to speak, in constant training. In this way, furthermore, it can hardly happen that the batteries are discharged so far as to pass into an unfavorable power range.

For a rapid and efficient charging of the battery blocks it is moreover considered desirable, according to another feature of my invention, that in parking position or at the network supply station the batteries are connected in series and balanced while the charging current is taken from the network.

In order that also the energy of the solar cells can be fully utilized for the charging of the blocks and can always be supplied in the optimum ranges, I prefer that multipled solar cells distributed over the outer skin of a vehicle be cascaded in packs and these rows of solar-cell packs be connected in series or in parallel, depending upon the driving voltage of the load, with selection of a connection or arrangement of the packs obviating unequal energy deliveries in the presence of unequal lighting conditions. The last-mentioned measure has the result that the individual battery blocks can be uniformly charged even when, for example, a part of the vehicle is in the shade.

According to the invention it is furthermore advantageous that the energy of the solar cells be additionally supplied to a battery block delivering the energy for the usual loads of a vehicle such as for an electric brake, for illumination, for the electronic control system or the like. Here the driving operation proper is intentionally separated from the other loads in order to increase the operational safety. Furthermore, a smaller accumulator can be stabilized with simpler means than a larger one so that it is possible to extract relatively constant voltages from the smaller accumulator which are particularly important for the operativeness of the electronic control system on which depend all the switching processes here required.

The means for charging the battery block or blocks of my improved system may include polyphase-current generators at the wheel axles of a vehicle and a multiplicity of solar cells on the outer skin of the vehicle body; furthermore, besides the charger operating on network current, fuel cells preferably serve for supplying the battery blocks with energy. I prefer to utilize elements known per se, inasmuch as these are units proven in practice which not only are dependable in operation but are at least in part economically priced. It is obvious that one could also use other energy sources, such as small emergency current generators, in lieu of the preferred fuel cells.

With a view to providing easily manipulable battery blocks and also with regard to the battery voltage, each battery block advantageously consists of ten to twenty batteries, preferably fifteen, each with six sealed cells especially on a lead/gelatin basis, the number of battery blocks corresponding to the number of windings of a polyphase motor to be operated thereby. If three battery blocks are provided, a polyphase motor with three windings can be operated very conveniently which results in an extraordinarily favorable power diagram.

In order that the battery blocks may actually be considered as being independently active within the circuitry, it is advantageous to allocate to each battery of a block an electrical circuit comprising two supply conductors common to all the batteries from which leads are branched off to the terminals of each battery. I may then insert in these conductors, for the parallel connection of the batteries, transistors or semiconductor switches controlled by relays or actuatable by optocouplers while further providing for the series connection of the batteries, correspondingly controlled thyristor switches or the like between the positive and negative terminals of two adjacent batteries of the entire block. Here, too, there are being utilized the simplest, safest and cheapest means which occupy little space and can be accommodated in the unit of the respective block.

Since it is known that a charging of batteries with large currents involves problems, it is useful to provide a balancing arrangement for the charging of each battery block e.g. in the form of a series of resistors corresponding to the number of batteries which by means of circuit breakers are respectively connectable across the terminals of each battery.

In order to provide stable, inherently solid units or blocks, the individual batteries are cemented together to form a block according to the invention, with omission of a battery in at least one corner area to provide a switching and mounting space. This free space is of particular significance insofar as it is best suited for accommodating all switching elements and other auxiliary means for a battery block in such a manner that they do not project beyond the battery assembly and are thus protectively disposed a corner, thereby enhancing the operational safety.

A further feature of the invention resides in that the individual batteries are arranged in two rows and their terminals are oriented toward their common center. This results in the smallest structural length that appears to be achievable. It is advantageous, moreover, that for the closely juxtaposed terminals a minimum amount of wiring is sufficient which saves not only costs but also weight.

In order to intensify the advantage of a solid battery block, I prefer to envelop the individual batteries by a glass-fiber mat permeated by synthetic resin, leaving only the terminals free and forming there an injection channel designed to accommodate the necessary switching means and conductors in an unobstrusive, protected as well as space-saving way.

Since batteries normally can deliver their full power only at certain temperatures and since the charging also advantageously occurs in certain temperature ranges, and since furthermore the service life is more favorably influenced by predetermined temperatures, heating wires may be placed on the glass-fiber mat, followed by a further synthetic-resin-impregnated glass-fiber mat, the heating wires as well as the mat being disposed only at the sidewalls and the bottom of the respective block. The omission of heating wires at the upper block surface is in no way disadvantageous since the heat flows upwardly in any event and since a heating at the upper surface, which would then have to be provided with leads, switches and control elements, would only have a disturbing effect.

In order to insure that each battery block also have the necessary mechanical stability, the block may be formed from a synthetic-resin-impregnated glass-fiber web possibly underlain by a metal foil. A metal foil or layer of foamed synthetic resin protects the block against undesired outward radiation which could be detrimental.

The components received in the aforementioned injection channel, required for the circuitry of the respective block may include relays, thyristors, transistors, conductor strips, bus bars or the like, the heat-generating elements being mounted on cooling bars which project from the molded mass with significant portions of their surface. This not only provides a protective lodgment for the partly sensitive thyristors or the like but also results in a satisfactory temperature control by the bars which favorably influences the switching operations and the life span of the equipment. In order to facilitate the transporting and the installation and removal of each battery block, the web of the outer jacket may simultaneously form handgrips, mounting lugs, screw anchors or the like.

Since the task of driving operation of an electric vehicle should not be disturbed by other influences, I further propose that the battery blocks for the operation of at least one polyphase motor be supplemented by an additional energy accumulator supplying other loads, e.g. a lead/gelatin accumulator, whose charging occurs mainly by the excess of the solar energy and by braking energy. This separation of the other loads from the driving operation not only results in a steadier drive but also promotes the switching reliability of the electronic system by supplying a substantially constant control voltage hardly available in the driving system in the presence of, say, overload or low loads.

For a full utilization of the solar-cell energy and in the interest of uniform charging currents it is furthermore advantageous, according to the invention, that the solar cells provided on the outer skin of the vehicle body form transverse rows of solar-packs with preferably forty-four individual cells per row and that these rows, e.g. ten in number, be distributed over the entire length of the respective vehicle and be connected to lateral conductors, this solar-cell array being repeated on the outer skin as many times as there are battery blocks in use.

Advantageously the rows of solar-cell packs of eacy array are connectable by a suitable arrangement of switching relays, actuatable via control leads, in or to the lateral conductors in series or in parallel. This insures satisfactory charging and driving.

BRIEF DESCRIPTION OF THE DRAWING

The above features of my improved system will now be described in greater detail with reference to the accompanying drawing in which.

SPECIFIC DESCRIPTION

Figure 1:
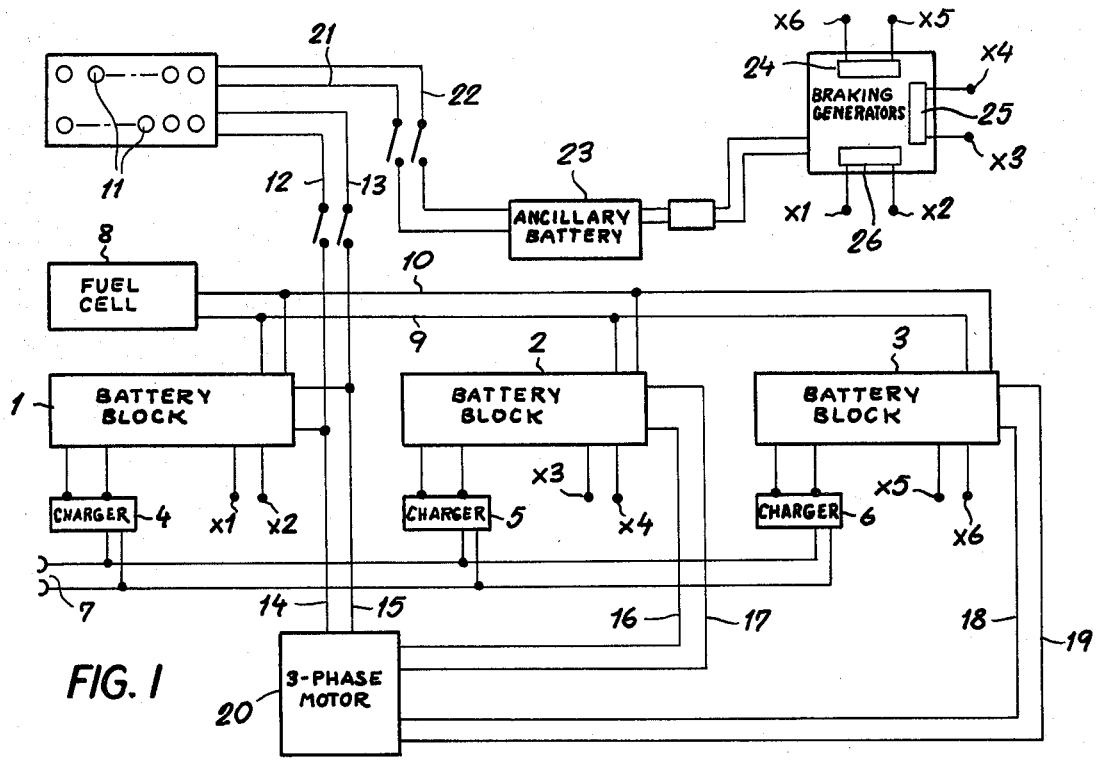
FIG. 1 shows a block diagram of a circuit arrangement for the charging of battery blocks from four diverse energy sources prior to their discharge into an electric motor.

In FIG. 1, three battery blocks have been designated 1,2,3. Each of the blocks 1 to 3 is coupled to a respective rapid charger 4, 5 and 6 supplying rectified and stabilized current from a utility network. The operating voltage here advantageously corresponds approximately to the network voltage.

The blocks 1 to 3 can be further supplied from a generator 8, e.g. a fuel cell, serving as an emergency current supply, which is connected via respective leads 9, 10 to the individual blocks 1 to 3. The charging voltages here is advantageously in the low-voltage range, i.e. in the range of the voltage which exists when the individual batteries of the blocks are connected in parallel.

A third energy source for supplying the blocks 1, 2, 3 is formed by a multiplicity of solar cells 11. This energy source delivers a charging current via conductors 12, 13 to the blocks when they are connected in series. The conductors 12, 13 coincide in this embodiment with leads 14, 15, 16, 17 and 18, 19 (as illustrated only for the conductor pair 14, 15 which extend from the blocks 1, 2, 3 to a polyphase motor 20, i.e. these solar cells 11 are connected in packs to the blocks 1, 2, 3. It will be obvious that there are also provided suitable circuit-breaking and reversing switches as well as circuit elements.

The solar-cell array also supplies via leads 21, 22 a further battery 23 serving to energize the usual loads of a vehicle. From this battery 23 of, for example, 16 volts, moreover, the current for the electronic control system etc. is taken. A further charging facility for the battery 23 is provided by one of three braking generators 24, 25, 26 which together constitute a fourth source of energy for the blocks 1, 2, 3. The terminals or taps of the braking generators 24, 25, 26 are designated x1 to x6, as are the terminals of the blocks 1, 2, 3. Nonillustrated leads extend between the identically designated locations.

Figure 2:
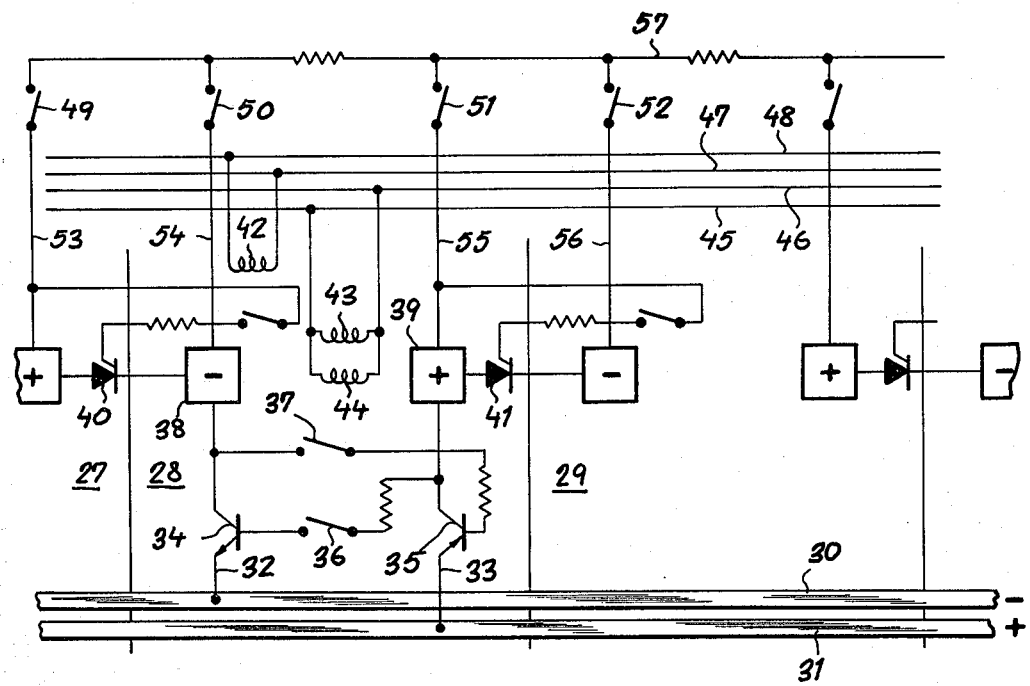
FIG. 2 shows part of the circuitry of FIG. 1 for one battery block.

In FIG. 2 there are indicated three individual batteries 27, 28, 29 each provided with six cells. In the lower region of the Figure two bus bars 30, 31 can be seen which are connected to the power generator 8 of FIG. 1. From these bus bars 30, 31, leads 32, 33 including switching transistors 34, 35 are branched off to each battery (illustrated only for the battery 28). References 36, 37 designate switching relays. The lead 32 is connected to the negative terminal 38 and the lead 33 is connected to the positive terminal 39 of the battery. When the leads 32, 33 are not interrupted, the block 1 is in its parallel-connected state. When it is desired to switch to series connection, thyristors 40, 41 come into play which upon interruption of leads 32, 33 connect the individual terminals 38, 39 of the several batteries—here 27, 28, 29—in cascade.

References 42, 43, 44 designate auxiliary windings which are joined to control leads 45, 46, 47 and 48 and serve to switch the transistors or thyristors 34, 35 or 40, 41 by means of relay contacts such as those shown at 37, 38. To each terminal 38, 39 there are connected switches 49, 50, 51, 52 adapted to interrupt the leads 53, 54, 55 and 56. These leads extend to a resistor chain 57 so that parallel currents flow to each battery 27, 28, 29 for balancing same when the batteries are nearly fully charged.

Figure 3:
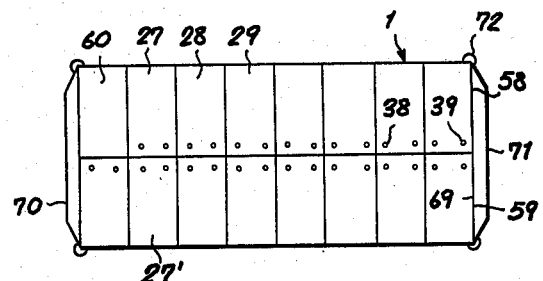
FIG. 3 shows a top view of a battery block with omission of its upper covering.

From FIG. 3 it will be noted that fifteen batteries (such as those designated 27, 27', 28, 29) of the block I are disposed in two rows 58, 59, the row 58 including seven and the row 50 including eight individual batteries. The individual batteries of the two rows are so assembled that their terminals 38, 39 lie next to one another in the middle of the battery block 1. In the space 60 of row 58, i.e. the one which lacks a battery in comparison with the other row 59, connectors and other circuit elements are received.

Figure 4:
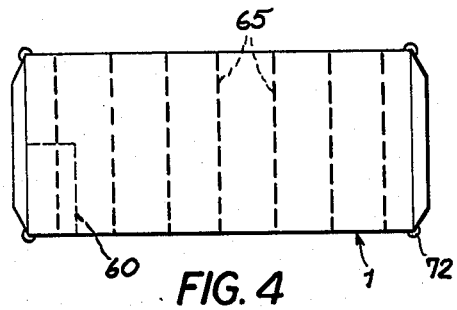
FIG. 4 shows a battery block in bottom view.
Figure 5:
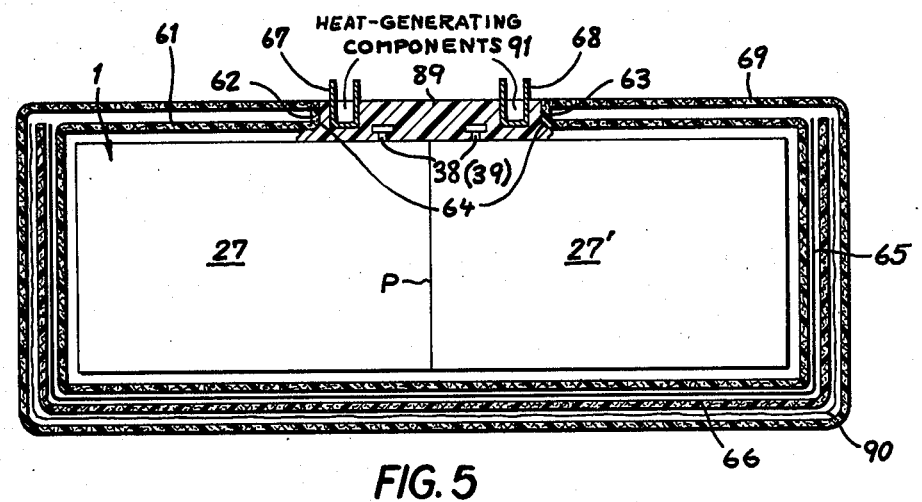
FIG. 5 shows a somewhat exploded cross-sectional view through a battery block, enlarged with reference to FIGS. 3 and 4.

From the sectional view of FIG. 5 it will be apparent that the individual batteries of each block, here the block 1, are closely juxtaposed and are cemented together at their points of contact. This results in a solid unit. For the further improvement of the stability of this unit, the block 1 is surrounded by a synthetic-resin-impregnated glass-fiber mat 61 whose edges 62, 63 form an injection channel 64 for the introduction of molding material 89. At the sidewalls and the bottom of the jacketed block there are provided heating wires 65 as seen particularly clearly in FIGS. 4 and 5. A further glass-fiber matt 66, also consolidated by snthetic resin, serves to cover these heating wires 65. The layer 66 can be followed by a heat shield 90 in the form of a radiation foil or an insulation of foamed synthetic resin. The terminals 38 and 39 of the individual batteries, interconnected according to the circuit diagram of FIG. 2, project into the injection channel 64. Naturally, the injection channel 64 also contains the necessary relays, thyristors, transistors, cables etc. Those components which generate heat or become hot are mounted on cooling bars 67, 68 which project with substantial portions of their surface from the molded mass 89 of the injection channel 64, as schematically illustrated at 91. For complete sealing and for mechanical stabilization, each block further comprises an outer jacket 69 which consists of a glass-fiber web and is solidified by a synthetic-resin impregnation. Naturally, the cooling bars 67, 68 flanking the rows of battery terminals 38, 39 also project beyond this outer skin.

The two rows of batteries 58, 59 are seen in FIG. 5 to adjoin each other along a plane P which longitudinally bisects the injection channel 64 accommodating their terminals 38, 39 together with the circuit elements referred to above.

As will be noted from FIGS. 3 and 4, the block 1 is provided with handgrips 70, 71 and mounting lugs 72 formed by the outer jacket 69. The elements 70, 71, 72 facilitate not only the mounting but also the handling of the blocks.

Figure 6:
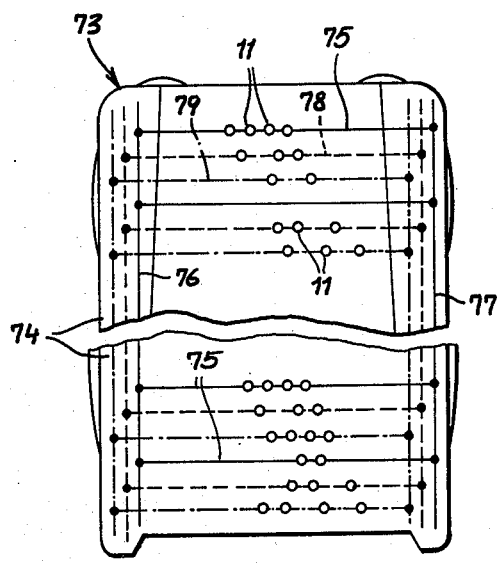
FIG. 6 shows a diagrammatic top view of a body of an automotive vehicle having solar cells disposed thereon.

In FIG. 6 there is visible, in top view, a schematically indicated body 73 of an automotive vehicle on whose outer surface 74 the solar cells 11 are disposed in a multiple array. These solar cells are cascaded in packs or rows, with forty-four cascaded solar cells considered advantageous when the battery 23 is to have an operating voltage of 18 volts, for example. With forty-four cells one obtains a voltage of about 20 volts. Transverse rows 75 of solar-cell packs, connected to lines 76, 77, are distributed over the entire length of the vehicle which obviates detrimental consequences of non-uniform light incidence. The mode of connection of the solar cells 11 will be explained hereinafter.

Dotted lines 78 and dot-dash lines 79 in FIG. 6 indicate together with the solid-line rows 75 that the body 73 carries three interleaved and mutually identical solar-cell arrays associated with the three battery blocks 1, 2, 3 which must be charged in a uniform, safe and yet effective manner. This is based on the assumption that only one polyphase motor 20 with three windings is being used. If, for example, two motors of three windings each were employed, the number of arrays would have to be increased to six. The interleaved rows 75, 78, 79 of the illustrated arrays recur a number of times in the same sequence.

Figure 7:
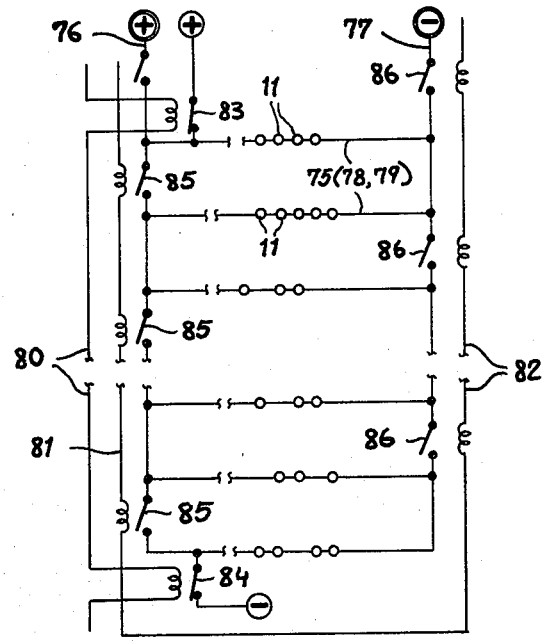
FIG. 7 shows a circuit diagram for the solar cells of FIG. 6.

FIG. 7 illustrates the switching possibilities of the rows 75 of the packs of solar cells 11. Control leads 80, 81 and 82 have been shown, the lead 80 including windings of switching relays 83, 84. The leads 81 and 82, which may be interconnected, similarly control respective switching relays 85 and 86. If with the aid of a corresponding electronic switching system, or other suitable means, the contacts of relays 83, 84 are closed by the energization of lead 80 while all other relay contacts 85, 86 are open, a series connection is provided; with, say, ten rows 75 one obtains a charging voltage of about 200 volts which—as already explained—entails considerable advantages. If contacts 83, 84 are open and all other contacts 85, 86 are closed by the energization of leads 81, 82, there occurs a parallel connection of the rows 75 with a charging voltage of about 20 volts. The positive and negative high-voltage terminals effective with the series connection of the solar cells 11 in arrays 75, 76, 77 have been marked by one circle; the low-voltage terminals effective with a parallel connection have been marked by two circles.

I claim:

1. In an energizing circuit for an electric motor driving an automotive vehicle, in combination:
   an assembly of rechargeable batteries;
   an enclosure accommodating a block of said batteries and forming an injection channel above said block, said enclosure comprising a synthetic-resin-impregnated glass-fiber mat, said channel being occupied by a mass of molded resin;
   at least one cooling bar in said injection channel; and
   a heat-generating component mounted on said cooling bar within said mass, said cooling bar having significant surface portions projecting from said mass.

2. The combination defined in claim 1 wherein said enclosure further comprises an outer jacket surrounding said mat and heating wires between said mat and said jacket.

3. The combination defined in claim 2 wherein said enclosure includes a heat shield interposed between said heating wires and said jacket.

4. The combination defined in claim 2 or 3 wherein said heating wires and said heat shield extend only along the bottom and sidewalls of said enclosure.

5. The combination defined in claim 2 or 3 wherein said jacket is provided with gripping formations.

6. The combination defined in claim 1, 2 or 3 wherein the batteries of said block are disposed in two parallel rows adjoining each other along a plane longitudinally bisecting said injection channel.

7. The combination defined in claim 6 wherein the batteries of said rows have terminals extending into said injection channel on opposite sides of said plane.

* * * * *